US012590644B2

(12) United States Patent
Woerner et al.

(10) Patent No.: US 12,590,644 B2
(45) Date of Patent: Mar. 31, 2026

(54) BEARING DEVICE FOR BEARING AN ARMATURE BODY OF AN ELECTROMAGNETIC SWITCHING OR VALVE DEVICE, AND ELECTROMAGNETIC SWITCHING OR VALVE DEVICE

(71) Applicant: Knorr-Bremse Systeme Fuer Nutzfahrzeuge GmbH, Munich (DE)

(72) Inventors: Ralf Woerner, Tiefenbronn (DE); Friedbert Roether, Cleebronn (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 7 days.

(21) Appl. No.: 18/715,387

(22) PCT Filed: Dec. 14, 2022

(86) PCT No.: PCT/EP2022/085859
§ 371 (c)(1),
(2) Date: May 31, 2024

(87) PCT Pub. No.: WO2023/111021
PCT Pub. Date: Jun. 22, 2023

(65) Prior Publication Data
US 2025/0027577 A1     Jan. 23, 2025

(30) Foreign Application Priority Data
Dec. 15, 2021     (DE) ..................... 10 2021 133 233.8

(51) Int. Cl.
F16K 31/06      (2006.01)
F16K 27/02      (2006.01)
(52) U.S. Cl.
CPC ........ F16K 31/0682 (2013.01); F16K 27/029 (2013.01)

(58) Field of Classification Search
USPC .......................................... 251/129.16, 129.2
See application file for complete search history.

(56) References Cited

U.S. PATENT DOCUMENTS 5,139,226 A * 8/1992 Baldwin ................... H01F 7/14
                                                          137/625.65
5,772,181 A * 6/1998 Robertson, III .... F16K 31/0682
                                                          251/234
(Continued)

FOREIGN PATENT DOCUMENTS

CN          2093285 U       1/1992
DE  202008012150 U1 * 12/2008  ............. G05G 5/065
(Continued)

OTHER PUBLICATIONS

International Search Report for PCT/EP2022/085859, Mar. 20, 2023.

*Primary Examiner* — Matthew W Jellett
(74) *Attorney, Agent, or Firm* — NORTON ROSE FULBRIGHT US LLP

(57) ABSTRACT

A bearing device for fixing and bearing an armature body of an electromagnetic-switching or valve device in a pretensioned manner using a force, including a bearing-force-generating-element (BFGE) for generating a pretensioning-force for bearing the armature-body (AB) and a transmission-element (TE) formed separately from the BFGE and which is pressed in the direction of the AB by the generated pretensioning force when the bearing-device is installed to fix and bear the AB. The TE has a first-side and a second-side lying opposite the first-side, in which the first-side faces the BFGE, and the second-side faces the AB when the bearing-device is installed and contacts the ABy at at least one force-introduction-point (FIP) of the AB such that the force introduction point is mechanically decoupled from the BFGE. A guide device at least partly surrounds the (Continued)

transmission element, and guides and positions the TE on the FIP of the AB.

17 Claims, 2 Drawing Sheets

(56) References Cited

U.S. PATENT DOCUMENTS

| | | | | |
|---|---|---|---|---|
| 7,021,603 | B2 * | 4/2006 | Wygnaski | H01F 7/1615 |
| | | | | 310/23 |
| 7,252,114 | B2 * | 8/2007 | Wygnanski | F16K 31/082 |
| | | | | 251/65 |
| 7,857,283 | B2 | 12/2010 | Gaiardo | |
| 10,711,914 | B2 * | 7/2020 | Roether | F16K 1/225 |
| 2005/0189021 | A1 | 9/2005 | Wygnanski | |
| 2019/0360609 | A1 * | 11/2019 | Roether | F16K 31/0682 |

FOREIGN PATENT DOCUMENTS

| | | | |
|---|---|---|---|
| DE | 102009045623 | A1 | 4/2011 |
| DE | 202014105447 | U1 | 5/2015 |
| DE | 102014115206 | B3 | 2/2016 |
| DE | 102014115207 | A1 | 4/2016 |
| DE | 102016105532 | A1 | 9/2017 |
| DE | 102018123997 | A1 | 4/2020 |
| EP | 1860314 | A2 | 11/2007 |
| WO | 03102454 | A1 | 12/2003 |

* cited by examiner

BEARING DEVICE FOR BEARING AN ARMATURE BODY OF AN ELECTROMAGNETIC SWITCHING OR VALVE DEVICE, AND ELECTROMAGNETIC SWITCHING OR VALVE DEVICE

FIELD OF THE INVENTION

The present invention relates to a bearing device for the force-preloaded fixing and bearing of an armature body of an electromagnetic switching or valve device, and to an electromagnetic switching or valve device having such a bearing device.

BACKGROUND INFORMATION

Such electromagnetic switching or valve devices are understood, for example in the form of an electromagnetic relay or an electromagnetic solenoid valve. Solenoid valves, for example in the form of tilting armature valves, are used, for example, as a control valve for pressure regulation, for example in a vehicle, such as in a utility vehicle or bus for passenger transport. For example, a braking system for a vehicle having a service brake system comprises at least one control valve for pressure regulation.

A tilting armature valve is discussed, for example, in DE 10 2016 105 532 A1. The tilting armature valve has a coil element with a coil core and a coil arranged radially around the coil core, and an armature which, on one end face of the armature, is supported by a bearing, wherein the armature can be moved from a first position to a second position, in particular by applying current to the coil. Also provided are a valve seat with an outlet and an inlet for a fluid, wherein the outlet can be closed in a fluid-tight manner by a sealing element in the first position of the armature and the outlet is opened in the second position of the armature. According to one embodiment, a spring is provided to press the armature onto the coil element or a housing of the tilting armature valve.

Furthermore, further types of solenoid valves are understood, as discussed e.g. in DE 10 2014 115 207 A1, DE 10 2018 123 997 A1 or DE 10 2014 115 206 B3.

In electromagnetic switching or valve devices, such as the configurations of solenoid valves specified by way of example, conventional armature guides and bearings are normally implemented via a form fit, a spring-preloaded bearing or a fixed flexure bearing. In tilting armatures in a relay, simple hinge-like bearings are often used which, during the mounting process, are fixed by plastic deformation. In solenoid valves, on the other hand, the "free-flying" reciprocating armature is highly widespread. In electromechanical switching elements with little operating stroke, thin leaf springs are firmly connected and, in use, move within their elastic range. Tilting armatures in valve technology are often equipped with spring-loaded bearings, in order to operate without play and independently of wear.

In spring-preloaded bearings, an influence of the bearing springs on the armature body and therefore also on the switching or valve element is present in the majority of cases. Depending on the tolerance and mounting, this influence plays a positive, neutral or negative role for the function. In particular in the use as an actuator in open-loop and closed-loop control loops, high repetition accuracy and a switching response that is constant over mass production is essential. From a commercial point of view, a classic spiral spring is often used for this purpose. However, this spring element has the disadvantage that the force introduction point is not located centrally on the spring mid-axis but is always off-center as a result of production. Since an oriented installation of the spring is extremely complicated; the result is different force action points. Furthermore, spring centering is necessary, since the spring in most cases does not perform only an axial movement on a tilting armature. This centering makes mounting more difficult and increases the risk of failure as a result of mounting errors.

In addition, an exact configuration of the spring is not possible with the customary methods due to the superimposed translational and rotational movement of the tilting armature. In relation to the mounting, during the use of directly acting springs, the mounting direction must also be considered since, as a rule, the bearing spring is placed opposite the armature stroke restoring spring. Thus, additional precautions which keep the spring element in its intended position until mounting is complete have to be taken.

SUMMARY OF THE INVENTION

The present invention is based on the object of specifying a bearing device for the force-preloaded fixing and bearing of an armature body of an electromagnetic switching or valve device and an electromagnetic switching or valve device having such a bearing device which, with relatively little effort on mounting, permit the introduction of force to be fixed at a defined bearing position on the armature body.

The invention relates to a bearing device for the force-preloaded fixing and bearing of an armature body of an electromagnetic switching or valve device and an electromagnetic switching or valve device having such a bearing device according to the appended independent patent claims. Advantageous forms and developments of the invention are specified in the sub-claims and the following description.

In particular, one aspect of the present invention relates to a bearing device for the force-preloaded fixing and bearing of an armature body of an electromagnetic switching or valve device, having a bearing force generating element for generating a preloading force for the bearing of the armature body, a transmission element formed separately from the bearing force generating element which, when the bearing device is installed, is forced in the direction of the armature body by the generated preloading force in order to fix and bear the armature body, wherein the transmission element has a first side and an opposite second side, wherein the first side faces the bearing force generating element and the second side faces the armature body when the bearing device is installed and contacts the armature body at at least one force introduction point of the armature body in such a way that the force introduction point is mechanically decoupled from the bearing force generating element, and a guide device which at least partly surrounds the transmission element and is configured to guide and position the transmission element on the force introduction point of the armature body.

Another aspect of the invention relates to an electromagnetic switching or valve device having an electromagnetic actuator, a movable armature body as a switching or valve element, which interacts with the electromagnetic actuator for a movement of the armature body that is to be activated, and a bearing device according to the invention, wherein the armature body is fixed and supported in the switching or valve device on one side by the bearing device and is movable from a first position to a second position by activating the electromagnetic actuator.

With the invention, with relatively little mounting effort, the introduction of force can be fixed at a fixed bearing position on the armature body, even when using different bearing force generating elements, such as spring elements of different configurations. This is made possible by using a transmission element according to the invention, which contacts the armature body at the bearing position at at least one force introduction point of the armature body, wherein the force introduction point of the armature body is mechanically decoupled from the bearing force generating element by the transmission element.

This type of bearing force generation for force-preloaded, in particular spring-loaded, bearing points can in principle be applied in all electromagnetic tilting and hinged armatures of magnetic valve and switching devices. As a result of the decoupling by a force-preloaded transmission element, it is possible to fix the introduction of force at a defined point on the armature body. At the same time, oriented installation or another specific alignment of a spring for the bearing force generation, as described in the introduction, is not necessary. Thus, mounting the bearing device and thus the electromagnetic switching or valve device with relatively little effort is made possible. By suitable selection of the material of the transmission element, corrosion and wear do not have to be considered in a spring configuration or selection of the armature material. Since no spring guide is necessary on the armature body, erroneous mounting of the spring is also prevented.

According to one embodiment, the bearing device is configured in such a way that the bearing force generating element, for example a spring element, is preloaded, so that the transmission element lifts off a surface of the guide device. In other words, the bearing device is configured such that, following the mounting of the subassembly, the bearing force generating element, for example in the form of a spring element, is additionally preloaded and thus the transmission element, for example in the form of a ball, lifts off the plastic seat surface.

According to one embodiment, the transmission element is formed on the second side in such a way that the at least one force introduction point is fixed at at least one defined contact point on the armature body. As a result of the decoupling by a force-preloaded transmission element, it is possible to fix the introduction of force at a precise, predefined point on the armature body.

According to one embodiment, the transmission element is at least partly rounded on the second side. In particular, the transmission element may be at least partly spherical, in particular formed as a ball. In addition, the transmission element can also be configured, at least in part, to be cylindrical, rectangular or matched otherwise to the function, in order accordingly to meet the requirements on the bearing force generating element, for example a specific spring element configuration, and to match the shape of the armature body.

In an advantageous embodiment, the mechanical decoupling of the bearing force generating element relative to the armature body can be carried out, for example, via a ball. This can be obtained economically and is very simple as regards handling and mounting, since no attention has to be paid to orientation. In addition, as a result of the spherical shape, a defined contact point is produced, which also permits certain adaptation effects. The ball is, for example, placed in the guide device in the manner of a spherical guide, which ensures contact of the ball with the armature body above the tolerance level. On the opposite side, a spring element, for example, e.g. a spiral spring, is positioned under preload.

According to one embodiment, the bearing force generating element has at least one spring element. In one embodiment, the at least one spring element is formed as a spiral spring.

According to one embodiment, the bearing force generating element has at least one spring element, and the guide device is formed in such a way that a movement of the at least one spring element in the direction of the generated preloading force is a pure translational movement in an axial direction of the guide device. Therefore, the movement of the spring element is advantageously converted into a pure translational movement in the axial direction of the guide device, which in turn leads to a defined and predictable loading condition for the spring element.

According to one embodiment, the guide device is configured to be tapered on the second side of the transmission element. Therefore, the positioning of the transmission element at a defined force introduction point can be carried out still more precisely. Furthermore, it can be made difficult or prevented for the transmission element to be unintentionally forced out of the guide device by the preloading force, for example before or while the bearing device is being mounted in the switching or valve device. According to one embodiment, the guide device is formed in two parts. Thus, no forcible de-molding in a production tool is necessary.

According to one embodiment, the guide device is configured to be tapered on the second side of the transmission element in such a way that the transmission element is prevented from moving out of the guide device because of the preloading force when the bearing device has not been installed. Therefore, the transmission element cannot jump out of the guide device under the preloading force. Thus, mounting a preassembly group upside down is also possible.

According to one embodiment, the bearing device is configured as a preassembled subassembly, which can be mounted in the electromagnetic switching device as a subassembly. By configuring the bearing device as a preassembled subassembly, consequently a closed functional unit, for example a spring element can be pre-installed and a mounting direction does not have to be considered.

According to one embodiment, the armature body is fixed and supported in the switching or valve device by the bearing device on one end face of the armature body.

According to one embodiment, the armature body is formed as a plate armature. Here, the plate armature can advantageously be formed as a tilting armature.

According to one embodiment, the electromagnetic switching or valve device is configured as an electromechanical relay or solenoid valve, in particular a tilting armature valve.

According to one embodiment, the electromagnetic switching or valve device is configured as a solenoid valve for a pressure regulating module of a vehicle.

The embodiments described herein can be applied beside one another or else in any desired combination with one another.

The present invention is explained in more detail below using the figures illustrated in the drawings, which illustrate embodiments of the invention.

DETAILED DESCRIPTION

Figure 1:
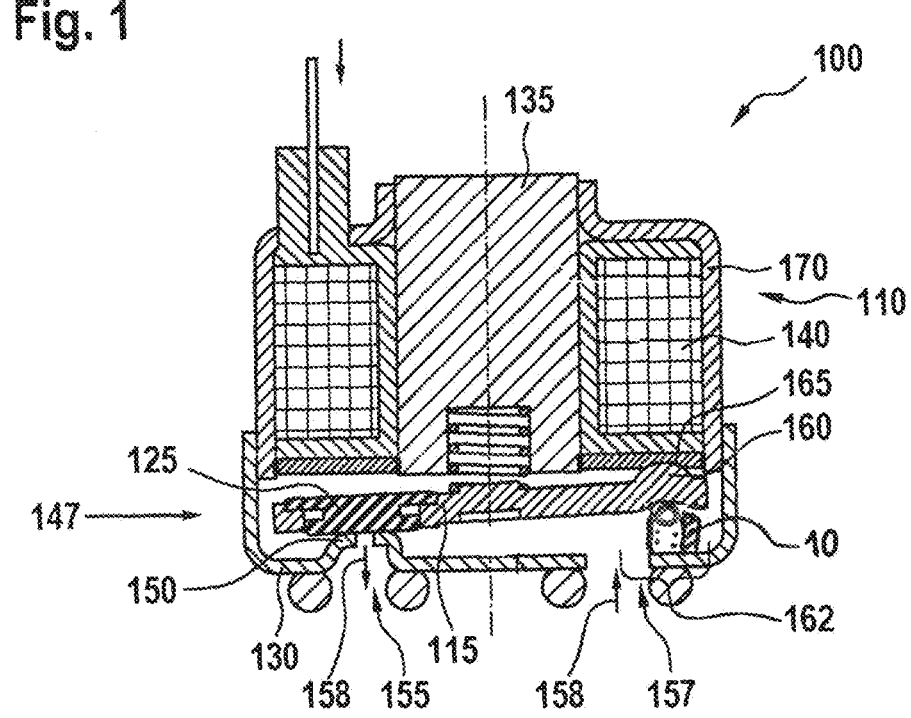
FIG. 1 shows a schematic cross-sectional illustration of an example of a tilting armature valve according to an exemplary embodiment of an electromagnetic valve device according to the invention.

FIG. 1 shows a simplified cross-sectional illustration of a tilting armature valve 100 according to an exemplary embodiment of the present invention. Embodiments of the invention will be described in more detail below with reference to the tilting armature valve 100 illustrated. However, those skilled in the art will be aware that the invention can in principle also be applied in other electromagnetic switching or valve devices which, like the present tilting armature valve 100, have an electromagnetic actuator and an armature body movable by a magnetic field as a switching or valve element, which interacts with the electromagnetic actuator for a movement of the armature body that is to be activated. The bearing device of the type of the invention, described in more detail below, can be used in such switching or valve devices, for example an electromagnetic relay or solenoid valve, for the force-preloaded fixing and bearing of the respective armature body, as described below by way of example with reference to the tilting armature valve 100. In this connection, it is pointed out that the basic functioning of electromagnetic switching or valve devices having an armature body movable by a magnetic field as a switching or valve element, in particular in relation to the electromagnetic actuator in interaction with the movable armature body, is known to those skilled in the art.

The tilting armature valve 100 can in principle be an exemplary embodiment of a tilting armature valve 100 shown in DE 10 2016 105 532 A1. In one variant, it can be a solenoid valve provided with the designation 100 in FIG. 1 therein. However, other exemplary embodiments are also conceivable, for example in connection with solenoid valves as described in the other documents cited above. Relevant configurations of a solenoid valve described in DE 10 2016 105 532 A1 and their components, and also their use also form part of the disclosure of the present invention by reference.

FIG. 1 shows a cross-sectional illustration through the tilting armature valve 100, in which the armature body is in a first position. The tilting armature valve 100 has a coil element 110, an armature body (or armature for short) 115, an embodiment of a bearing device 10 according to the invention, a seal element 125 and a covering shell (or generally a housing part) 130. The coil element 110 (which in general forms an electromagnetic actuator) comprises at least one coil core 135 and a coil 140 arranged radially around the coil core 135. One end face of the armature 115 is supported by the bearing device 10. The armature 115 is movable between a first position 147 and a second position, lifted or attracted when activated by the coil element 110, which opens an outlet 155 for a fluid 158 (not illustrated in FIG. 1). The armature 115 is configured to be moved from the first position 147 into the second, lifted position when the coil 140 is activated. When the coil 140 is activated, the armature 115 can be kept in the second position. The seal element 125 is also arranged on the side of the armature 115 that faces away from the coil element 110. Formed in the covering shell 130 is a valve seat 150 with the outlet 155 and an inlet 157 for the fluid 158. The outlet 155 is closable in a fluid-tight manner by the seal element 125 when the armature 115 is arranged in the illustrated first position 147. Here, the seal element 125 can also act as a damper element, in order to prevent the armature 115 from bouncing on the valve seat 150. The seal element 125 can be fastened to the armature 115 or a carrier element by vulcanization.

In one exemplary embodiment, the armature 115 has an at least partly round elevation 160 in a bearing section 162, the elevation 160 conveniently engaging in a recess 165 or opening which is arranged in a portion of a housing 170 of the tilting armature valve 100 that is arranged opposite the elevation 160. As a result, the armature 115 can slide in the recess during a movement from the first position 147 into the second position after a current flow through the coil 140 has been switched on, and is at the same time kept in a fixed position in the housing 170 and in relation to the covering shell 130. The recess is conveniently configured to be trapezoidal, so that the lowest possible friction is caused as the elevation slides over the surface of the recess 165. The recess 165 can be made of plastic material, for example, and as a result can be very simply and economically producible.

The bearing device 10 is arranged on a side of the armature 115 that is opposite the coil 140. The bearing device 10 is used to press the armature 115 against the housing 170 of the coil element 110 without play. Depending on the design, pressing can in principle also be carried out against another suitable component of the tilting armature valve 100. The armature 115 can be fixed by the bearing device 10, so that the armature 115 is kept in a predetermined position by the bearing device 10. This offers the advantage that a substantially constant preloading force can be exerted on the armature 115, and the force exerted on the armature 115 by the bearing device 10 can be introduced to the armature 115 as close as possible to a force introduction point of the armature 115 located on the axis of rotation. The bearing device 10 is illustrated only roughly schematically in FIG. 1 and will now be explained in further detail in conjunction with FIG. 2.

Figure 2:
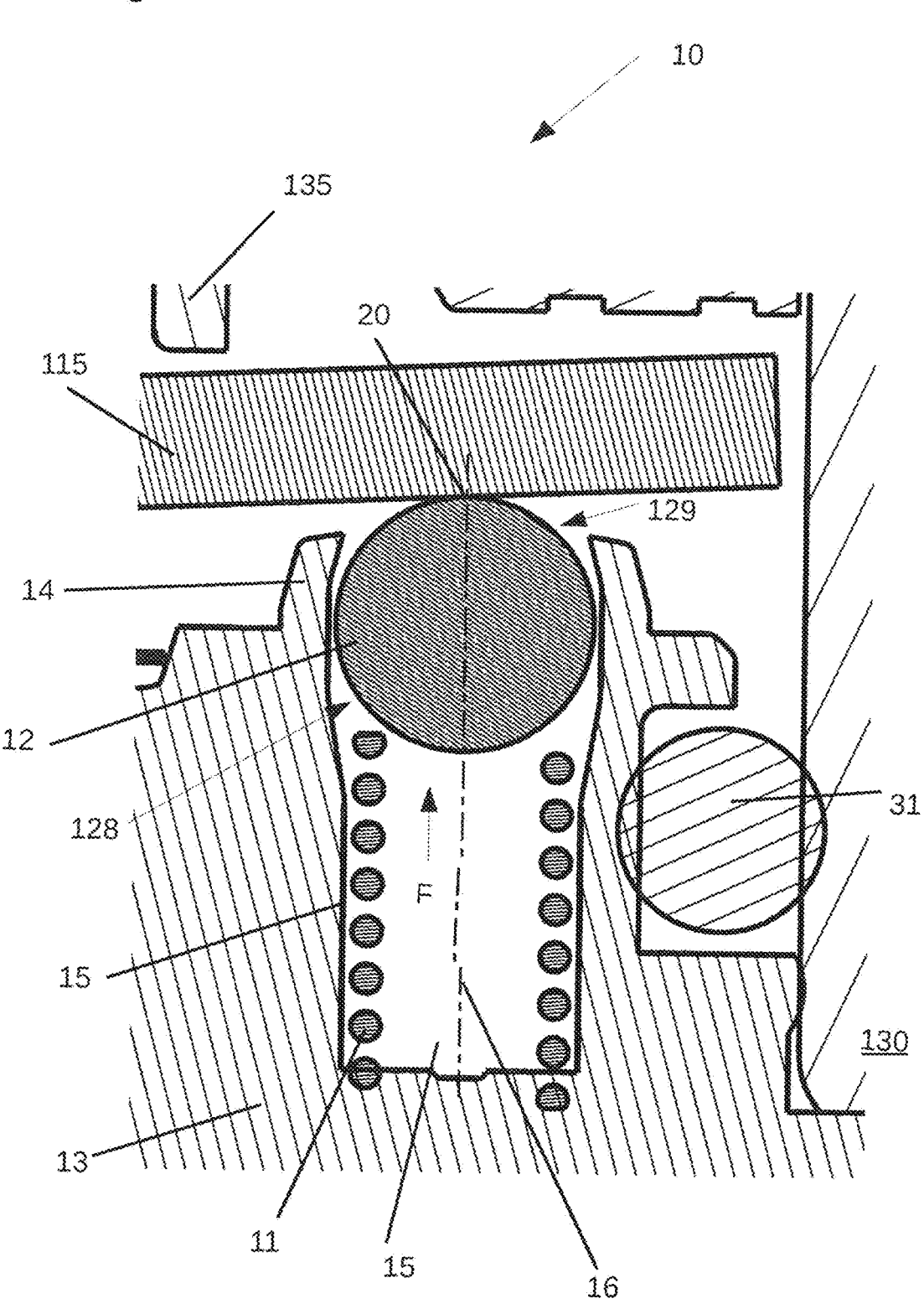
FIG. 2 shows a schematic cross-sectional illustration of an embodiment of a bearing device according to the invention, such as can be used, for example, in a tilting armature valve according to FIG. 1.

FIG. 2 shows a schematic cross-sectional illustration of an embodiment of a bearing device 10 according to the invention, as can be used, for example, in the tilting armature valve 100 according to FIG. 1. Here, the design of individual components, for example the surrounding housing part 130, the armature 115 and the coil core 135, has been modified, which also makes it clear that the bearing device 10 can in principle be used in different designs of electromagnetic switching or valve devices.

In the embodiment illustrated, the armature 115 is formed as a plate armature, as also in the embodiment according to FIG. 1, as is used, for example, in a tilting armature valve 100 according to FIG. 1. The armature 115 is fixed and supported on one side, in the present exemplary embodiment on the end face, in the tilting armature valve 100 by the bearing device 10 and is moved between the first and second positions by activating the coil 140, as described in relation to FIG. 1.

The bearing device 10 has a guide device 13, which at least partly surrounds a transmission element 12. In addition, the bearing device 10 has a bearing force generating element for generating a preloading force F for the bearing of the armature 115. In one embodiment, the bearing force generating element has at least one spring element 11, for example in the form of a spiral spring, or is configured as one. The spiral spring 11 generates a preloading force F in the direction of the axial axis 16 of the spiral spring 11 in the known way when compressed. The guide device 13 in turn can be fixed and sealed with respect to the housing part 130 by a seal element 31, for example in the form of an O-ring. In principle, other types of spring elements can also in a similar manner be used to generate a preloading force F.

The transmission element 12 may be configured in the form of a ball and forms a component separate from the spring element 11, in particular is not molded onto the spring element 11 or integrated therewith. The transmission element 12 has a first side 128 and an opposite second side 129. The first side 128 faces the spiral spring 11 and the second side 129 faces the armature 115. The transmission element 12 is forced in the direction of the armature 115 by the generated preloading force F of the spiral spring 11 and contacts the armature 115 at a force introduction point 20 of the armature, and therefore serves to fix and bear the armature 115 on the tilting armature valve. The transmission element 12 contacts the armature 115 at the force introduction point 20 of the armature in such a way that the force introduction point 20 is mechanically decoupled from the spiral spring 11. In the present embodiment, the transmission element 12 is not mounted or mechanically fastened to the armature 115, for example by a screw fixing or other fastening, but merely contacts the armature 115 and is pressed onto the armature 115 in a direction transverse to the armature surface as a result of the preloading force F. In this way, the necessary bearing force is generated. The transmission element 12 is formed on the second side 129 for example by a rounded form, in such a way that the force introduction point 20 is fixed at a defined contact point on the armature 115. The guide device 13 is used to guide and position the transmission element 12 on the force introduction point 20, in that it at least partly surrounds the transmission element 12, for example in the form of the edging 14, so that the transmission element 12 is fixed in the plane of the armature surface by the guide device 13, apart from a small amount of play or tolerance levels.

The transmission element 12 may be configured to be at least partly rounded on the second side 129, in order to fix a precise force introduction point 20. As described, the transmission element 12 may be formed as a ball, as illustrated in FIG. 2.

The guide device 13, which can be made of plastic, has, for example, a channel 15 (formed, for example, by a depression in a plastic body), which defines an axial direction of the guide device 13 and in which the transmission element 12 is at least partly held. The spiral spring 11 can also be located at least partly in the channel 15, so that the axis 16 of the spiral spring 11 coincides with the longitudinal axis of the channel 15. This advantageously achieves in situation in which a movement of the spiral spring 11 in the direction of the generated preloading force F is a pure translational movement in the axial direction.

According to one embodiment, the guide device 13 is configured to be tapered, at least on the second side 129 of the transmission element 12, for example by a corresponding tapering shape of the edging 14. As a result, when the bearing device 10 is not installed, the transmission element 12 is prevented from moving out of the guide device 13 and falling out as a result of the preloading force F. It is therefore possible to pre-assemble the bearing device 10 as a subassembly, which can then be mounted in the tilting armature valve 100 as a subassembly, even upside down, without the transmission element 12 falling out of the guide device 13.

The bearing device 10 has been described with reference to FIG. 1 in conjunction with a solenoid valve in the form of the tilting armature valve 100. In a use in an electromagnetic switching device, for example a relay, on the other hand, the armature 115 indicated in FIG. 2 could be used for example as an electrical switching element which closes or opens an electrical contact in a manner analogous to a valve opening. The described type of bearing force generation by the bearing device 10 can in principle be applied in all electromagnetic tilting and hinged armature valve devices and switching devices.

In summary, therefore, by using a bearing device 10 according to the invention, the force introduction point 20 on the armature 115 is mechanically decoupled from the spring element 11 by the transmission element 12. This type of bearing force generation for spring-loaded bearing points can in principle be applied in all variants of electromagnetic tilting and hinged armature valve devices and switching devices. As a result of the decoupling by a spring-preloaded transmission element 12, it is possible to fix the introduction of force at a precise point on the armature 115. In addition, the movement of the spring element is converted into a pure translational movement in the axial direction, which in turn leads to a defined and predictable load situation for the spring element 11. As a result of a suitable material selection of the transmission element 12, corrosion and wear do not have to be considered in the spring configuration or the selection of the armature material. Since no spring guidance is necessary on the armature 115, erroneous mounting of the spring element 11 is also prevented. As a result of the closed functional unit, the spring element 11 can be pre-installed and the mounting direction does not have to be considered.

The mechanical decoupling of the spring relative to the armature can be carried out, for example, via a transmission element 12 in the form of a ball. Such a component can be obtained economically and is very simple in terms of handling and mounting, since no attention has to be paid to orientation. In addition, as a result of the spherical shape, a defined contact point is produced, which also permits certain adaptation effects. The ball 12 can be set into a type of ball guide (in the embodiment of FIG. 2 formed by the channel 15 and the edging 14 of the guide device 13), which ensures contact of the ball 12 relative to the armature 115 above the tolerance level. The spiral spring 11 can be positioned in preloaded form on the opposite side of the ball. Alternatively, the transmission element 12 can also be configured to be cylindrical, rectangular or otherwise matched to the function, in order accordingly to meet the requirements on the spring element 11 and the form of the armature 115.

The guide device 13, for example in the form of a plastic part 13, can also be produced in two parts. Thus, no forcible de-molding is necessary during the production in the tool. The tool division would then in a two-part tool be located in the region of the installation space for the spring element 11.

THE LIST OF DESIGNATIONS IS AS
FOLLOWS

10 Bearing device
11 Bearing force generating element
12 Transmission element
13 Guide device
14 Edging
15 Channel
16 Axis
20 Force introduction point
31 Seal
100 Tilting armature valve
110 Coil element
115 Armature body
125 Seal element
130 Housing part
135 Coil core
140 Coil
147 First position

150 Valve seat
155 Outlet
157 Inlet
158 Fluid
160 Elevation
162 Bearing section
165 Recess
170 Housing

The invention claimed is:

1. An electromagnetic switching or valve device, comprising:

an electromagnetic actuator;

a movable armature body as a switching or valve element, the armature body being a plate armature and a tilting armature and interacts with the electromagnetic actuator to activate a tilting of the armature body; and a bearing device configured to generate a preload force to fix, bear, and support the armature body on a face of the armature body at one end of the armature body, the bearing device including:

a bearing force generating element for generating a preloading force for bearing the armature body, a transmission element formed separately from the bearing force generating element, the transmission element being forced in a direction of the armature body by the generated preloading force to fix and bear the armature body, wherein the transmission element has a first side and an opposite second side, wherein the first side faces the bearing force generating element and the second side faces the armature body and contacts the armature body at at least one force introduction point of the armature body located on an axis of rotation of the armature body so that the force introduction point is mechanically decoupled from the bearing force generating element, wherein the transmission element is configured to be: (i) at least partly spherical or (ii) a ball or (iii) at least partly cylindrical, and a guide device which at least partly surrounds the transmission element and which is configured to guide and position the transmission element on the force introduction point of the armature body;

wherein the armature body is fixed and mounted on the one end of the armature body by the bearing device, the armature being tiltable from a first position to a second position by actuating the electromagnetic actuator, and wherein in a bearing section at the one end of the armature body, the bearing device is configured to press the armature body against a component of the electromagnetic switching or valve device without play.

2. The electromagnetic switching or valve device of claim 1, wherein the bearing force generating element is additionally preloaded, so that the transmission element lifts off a surface of the guide device.

3. The electromagnetic switching or valve device of claim 1, wherein the bearing force generating element has at least one spring element.

4. The electromagnetic switching or valve device of claim 3, wherein the at least one spring element is formed as a spiral spring.

5. The electromagnetic switching or valve device of claim 1, wherein the bearing force generating element has at least one spring element, and wherein the guide device is formed so that a movement of the at least one spring element in the direction of the generated preloading force is a pure translational movement in an axial direction of the guide device.

6. The electromagnetic switching or valve device of claim 1, wherein the guide device is tapered on the second side of the transmission element.

7. The electromagnetic switching or valve device of claim 6, wherein the guide device is formed in two parts.

8. The electromagnetic switching or valve device of claim 6, wherein the guide device is tapered on the second side of the transmission element so that the transmission element is prevented from moving out of the guide device because of the preloading force.

9. The electromagnetic switching or valve device of claim 1, wherein the bearing device is configured as a preassembled subassembly, which is mounted in the electromagnetic switching or valve device as a subassembly.

10. The electromagnetic switching or valve device of claim 1, wherein the electromagnetic switching or valve device is configured as an electromechanical relay or solenoid valve.

11. The electromagnetic switching or valve device of claim 10, wherein the electromagnetic switching or valve device is configured as a solenoid valve for a pressure regulating module of a vehicle.

12. The electromagnetic switching or valve device of claim 1, wherein an axial axis of the bearing device is on the axis of rotation of the armature body.

13. The electromagnetic switching or valve device of claim 1, wherein the armature body has an at least partly rounded elevation in the bearing section on a side of the armature body on which the transmission element bears, the elevation engaging in a recess of a housing of the electromagnetic switching or valve device arranged opposite to the elevation, the armature body, at the elevation, sliding in the recess during a movement from the first position to the second position.

14. The electromagnetic switching or valve device of claim 13, wherein the recess in which the elevation engages is trapezoidal in shape.

15. The electromagnetic switching or valve device of claim 13, wherein the recess in which the elevation engages is made of plastic material.

16. The electromagnetic switching or valve device of claim 1, wherein the guide device is made of plastic.

17. The electromagnetic switching or valve device of claim 1, wherein edging of the guide device is tapered on the second side of the transmission element, the edging preventing the transmission element from moving out of the guide device.

* * * * *